(12) United States Patent
Walton

(10) Patent No.: US 12,415,240 B2
(45) Date of Patent: Sep. 16, 2025

(54) AUTOMATED PROCESSING OF A TURBOMACHINERY COMPONENT

(71) Applicant: Sulzer Turbo Services, La Porte, TX (US)

(72) Inventor: Matthew Walton, Pearland, TX (US)

(73) Assignee: Sulzer Turbo Services

( * ) Notice: Subject to any disclaimer, the term of this patent is extended or adjusted under 35 U.S.C. 154(b) by 0 days.

(21) Appl. No.: 18/381,961

(22) Filed: Oct. 19, 2023

(65) Prior Publication Data
US 2025/0128367 A1    Apr. 24, 2025

(51) Int. Cl.
*B23P 15/02* (2006.01)

(52) U.S. Cl.
CPC .................... B23P 15/02 (2013.01)

(58) Field of Classification Search
CPC ............ B23P 15/02; Y10T 29/4932; Y10T 29/49321; Y10T 29/49323; Y10T 29/49318; Y10T 29/49718; Y10T 29/49721
See application file for complete search history.

(56) References Cited

U.S. PATENT DOCUMENTS

| | | | | |
|---|---|---|---|---|
| 4,455,730 A * | 6/1984 | Guenther | F01D 25/285 | 29/252 |
| 6,041,500 A * | 3/2000 | Terpstra | B23P 15/006 | 29/889.22 |
| 6,325,459 B1 * | 12/2001 | Jaeger | E01C 23/121 | 173/100 |
| 6,711,795 B1 * | 3/2004 | Hsu | B23P 19/04 | 29/254 |
| 7,252,081 B2 * | 8/2007 | Havill | B28D 1/26 | 125/23.01 |
| 7,455,505 B2 * | 11/2008 | Hartmann | B23P 19/025 | 29/889.1 |
| 7,861,801 B2 * | 1/2011 | Alberty | E21B 49/02 | 175/58 |
| 7,934,302 B2 * | 5/2011 | Kalmar | F01D 5/005 | 29/283.5 |
| 8,090,557 B2 * | 1/2012 | Koch | G05B 19/4097 | 700/182 |
| 9,790,962 B2 * | 10/2017 | Robson | B30B 9/3057 | |
| 2002/0085917 A1 * | 7/2002 | Roberts | F01D 5/326 | 416/220 R |
| 2010/0162544 A1 * | 7/2010 | Sassatelli | F01D 25/285 | 29/889.1 |
| 2010/0162546 A1 * | 7/2010 | Kalmar | F01D 25/285 | 29/244 |

(Continued)

*Primary Examiner* — Sarang Afzali
*Assistant Examiner* — Darrell C Ford
(74) *Attorney, Agent, or Firm* — Global IP Counselors, LLP

(57) ABSTRACT

A method for processing a turbomachinery component, includes a processing installation including a mounting device, an impact device with an impact unit and a manipulating unit. The impact unit includes an impact tool, and the impact unit is attached to the manipulating unit. The turbomachinery component is mounted on the mounting device, and the manipulating unit and the mounting device are arranged in a predetermined position relative to each other. The processing installation is automatically controlled by a control device to exert an impact with the impact tool on the turbomachinery component.

18 Claims, 2 Drawing Sheets

(56) References Cited

U.S. PATENT DOCUMENTS

2011/0162179 A1* 7/2011 Howes ................. F01D 25/285
  29/23.51
2015/0218948 A1* 8/2015 Bird ..................... F01D 5/3007
  29/889.1

* cited by examiner

AUTOMATED PROCESSING OF A TURBOMACHINERY COMPONENT

BACKGROUND

Technical Field

The disclosure relates to a method for processing of a turbomachinery component and a processing installation and an impact device for performing the method.

Background Information

A turbomachinery component is in particular a component which is used in machines which transfer energy between a rotor and a fluid including turbines and compressors.

Such machines have a very wide range of applications. For example, pumps, compressors, and turbines are used in the energy sector, e.g., for pumping or compressing fluids, or for generating electricity. Turbomachinery machines can also be used in the aviation sector, e.g., as aircraft engines, or in laboratory applications, e.g., as turbomolecular pumps for generating vacuum.

SUMMARY

It has been determined that such machines often operate in harsh and demanding conditions. Therefore, the machines must reliably perform for several years. Of course, this also applies to all components that are installed in the machines. For these reasons, the machines and their components are very expensive. Therefore, the machines and their individual parts cannot simply be replaced but must be maintained and refurbished at regular intervals. In this process, the components are disassembled into their individual parts and individually maintained and refurbished. Due to the expensive new purchase prices, ideally only a few small parts should be replaced if necessary. The majority of the parts should be reused after the refurbishment.

However, disassembly of such a turbomachinery component is usually not easy. Due to the operation of the machines under harsh and challenging conditions, it is not uncommon for certain parts to be very tightly stuck or even jammed, so that they can only be released again with enormous mechanical effort.

This work, the disassembly, overhaul, repair and assembly of a turbomachinery component, is currently performed manually by an operator. In the context of this disclosure, the processing steps just mentioned are grouped under the word "processing". Thus, processing can mean the disassembly and/or the overhaul and/or the repair and/or the assembly of a turbomachinery component. Therefore, for a smaller component light hammer blows focused with a punch tool are used to work the component. Manually directed air hammers or electric hammers can be used when light hammer force is insufficient. Burs or excess material is machined off. This method only works when the required force is low, and the assembly is small. The process is also slow and requires constant interaction by the operator.

For a larger component large hand tools and portable pneumatic or power tools are used to process the turbomachinery component. Most often pneumatic or electric jackhammers are used to remove a component. These tools are heavy and require experienced users. The larger component must also be securely held to receive the processing impacts from the working tools. Therefore, the component is normally fixed on a table requiring the operator to position and reposition himself for each step of the processing operation.

Some of the parts of the turbomachinery component are arranged at an angle. For example, during the processing of a bladed compressor or a turbine disk their blades are typically inserted axially in a cyclic pattern into a disk in which dovetail grooves are provided. Therefore, the operator must hold the working tool securely at the same angle at which the dovetail roots are arranged in order to disassemble and/or assemble the blade. If he deviates from this angle the force transfer is reduced and thus the disassemble and/or assemble of the blade isn't effective and thus more time per blade is required. At the latest when changing the tool, the operator must leave his position and we never return to the 100% same position after the change.

In addition, the operator must automatically change his position when changing the turbomachinery component. If another type of turbomachinery component is to be processed, the operator must know how to process the other type of turbomachinery component. This means that he must learn how to do it before processing a new turbomachinery component for the first time. Normally, not only one operator is responsible for all processing. Therefore, in a company, several employees work on processing the turbomachinery components. Thus, each employee must be trained to process each possible component. One of the disadvantages of this is that such training takes a lot of time and effort. Furthermore, with different human operators, the same quality and standards are never always achieved. The operators can be well trained, but two different operators will still perform the work differently, even if only slightly.

Damage to a processed component is not an uncommon proposition when work is performed manually. Under operation, vibration and impact can cause the tool to slip and damage property, damage components, or injure operators. Therefore, if parts that are to be removed, refurbished and then assembled are damaged during disassembly, they must be replaced, and more material is needed. Thus, there is a risk that if disassembly and/or assembly is performed by an operator, the scrap rate will be significantly higher.

The impact force and the number of blows that must be transferred regularly and precisely to the part to be processed are essential for efficient and material-friendly work. It is almost impossible for a human operator to precisely comply with these requirements. Thus, physical strength and safety limits the size of impact tool a human operator can safely and accurately bring to bear on a part.

In addition, the operator faces many (health) risks throughout the manual processing of a turbomachinery component. Over time vibration and noise will wear on the operator's body. A turbomachinery component for examples, a blade or other components often do not move readily. Therefore, long periods of processing are possible. Although it can be helpful if the operator uses penetrating oils or local application of heat or cold to loosen components but when the described options fail a large hammer combined with custom tooling is used to loosen components. The danger to operators and components is an undesirable quality of this method.

Studies showed that the load on the operator during manual processing of a turbomachinery component can be significant. Operator fatigue from handling tools and heavy components degrades the speed at which work can be performed. Fatigue can also increase the likelihood of mistakes made during the processing.

Starting from this state of the art it is therefore an object of the disclosure to propose a method for the processing of a turbomachinery component and a processing installation for executing this method, which is more user-friendly, more material-friendly, more efficient, more cost-efficient, more constant, faster and safer than the present methods.

The subject matter of the disclosure satisfying these objects is characterized by the features described herein.

Thus, according to the disclosure a method for processing a turbomachinery component is provided, wherein the following steps are executed. First a processing installation, comprising a mounting device, an impact device with an impact unit and a manipulating unit, wherein the impact unit includes an impact tool, and wherein the impact unit is attached to the manipulating unit is provided. The turbomachinery component is mounted on the mounting device, and the manipulating unit and the mounting device are arranged in a predetermined position relative to each other. The processing installation is automatically controlled by means of a control device in order to exert at least one impact with the impact tool on the turbomachinery component.

As already mentioned, in the context of this application the word "processing" can mean the disassembly and/or the overhaul and/or the repair and/or the assembly of a turbomachinery component.

An advantageous aspect of the method is the automatic control of the processing installation. This leads to a more user-friendly method for processing turbomachinery components. The disassembly and/or the overhaul and/or the repair and and/or the assembly of turbomachinery components is executed by the processing installation. The operators do not have to face hard working conditions anymore. The processing installation takes over their work. Therefore, the work safety for the operator is improved and fatigue is mitigated. This increases efficiency enormously.

Another advantageous aspect of the method is that it achieves more repeatable results. The accuracy of the processing installation is significantly higher than that of a human operator. This includes, among other things, the fact that the force exerted by the impact tool on the turbomachinery component is much better dosed by executing the method with the processing installation than the human operator can do. As a result, fewer components are damaged, making the method performed with the processing installation a much gentler method on the material. One consequence of this is that scrap during processing is significantly reduced.

Furthermore, the processing installation works faster then the human operator. Therefore, the whole process of processing the turbomachinery component is getting more effective as the processing installation also can run around the clock. As a result, the whole process naturally becomes more cost-effective.

For mounting the turbomachinery component during the processing according to the method the mounting device is provided. The mounting device is in particular a rotary table and/or an indexing chuck and/or any suitable device for mounting and/or fixing components during processing. The mounting device is as a part of the processing installation also automatically controlled by the controlled device. So, it can be moved in all three spatial dimensions. Furthermore, the mounting device comprises a drive with which the turbomachinery component can be rotated automatically. Rotation is used for example, when the turbomachinery component mounted on the mounting device is to be moved in the process of processing in order to perform the next work step. It is also possible that the mounting device can perform movements around five-axis (three spatial axes and two rotation axis), In some advantageous embodiment the mounting device can perform movements around six-axis (three spatial axes and three rotation axis).

The impact device comprising the manipulating unit and the impact unit with the impact tool is configured to interact with the turbomachinery component mounted on the mounting device. The manipulating unit with the attached impact unit can be moved in all three spatial dimensions. Furthermore, an advantageous measure is that the manipulating unit is configured to move the attached impact unit around five-axis (three spatial axes and two rotation axis). In some advantageous embodiment the manipulating unit is configured to move the attached impact unit around six-axis (three spatial axes and three rotation axis).

The impact unit which is attached to the manipulating unit comprises the impact tool for interacting with the turbomachinery component. The impact unit can be moved around five-axis by the manipulating unit. In preferred embodiments the impact unit can be moved around six-axis by the manipulating unit. This allows the impact tool to exert impacts on the turbomachinery component from any direction. In addition, the automatic control by the control device of the entire processing installation moves the impact tool in the optimum position for each work step. This position can be controlled within the usual accuracy of mechanical equipment. This optimum position can also be adjusted automatically by the control device. Likewise, the impact tool can be moved to exactly the same position for each turbomachinery component and/or part to be processed and always processed under exactly the same conditions. These include, among other things, the angle at which the impact on the turbomachinery component is performed or the force with which it is performed. A human operator could never do this with such precision and repetition rate. Overall, the ideal working conditions for each step of the processing are always available for different turbomachinery components or parts thereof. This makes it possible on the one hand to significantly increase the speed of processing the turbomachinery component, which in turn increases efficiency, and on the other hand to deliver consistently high processing quality.

In an advantageous embodiment of the method, the processing includes a disassembly of the turbomachinery component.

Another advantageous aspect of the method is that the impact device, more precisely the impact unit can handle larger impact tools then a human operator. In particular, larger impact tools or larger tools in general have more power than smaller ones. Thus, the impact power transferred to the turbomachinery component can be applied in a predetermined manner and/or a predetermined force for example can be doubled compared to the processing by hand. This makes it possible to process larger turbomachinery components and/or parts thereof. This is especially advantageous when disassembling the turbomachinery component, where some parts are heavily jammed, that a human operator would not be able to solve or only with enormous effort.

Another advantageous aspect of the method is that the impact unit comprises more than one impact tool. In some embodiment of the impact unit, it is possible to attach two or more impact tools at the same time. This allows to process the turbomachinery component with two or more different impact tools at the same time. On the one hand it is obvious that this embodiment saves a lot of time while processing the turbomachinery component with two or more tools at the same time because two or more work steps can be done together and on the other hand it is possible to assist one work step with a first impact tool with a second or more impact tools.

The impact tool can be at least one of the group comprising: a hammer, a chisel, a drill, an impact wrench, a screwdriver, a grinder, any other tool which is suitable as an impact tool.

Furthermore, it is advantageous that the impact unit comprises a processing tool. The processing tool can be used alone during the processing of the turbomachinery component or parts thereof or in combination with the impact tool. The processing tool for example can be a grab and/or pliers and/or any suitable tool for processing a turbomachinery component. For example, to assemble the turbomachinery component, it is useful to have a grab that holds, for example, a part of the turbomachinery component while and/or afterwards the impact tool hammers, for example, to assemble the part.

An advantageous measure for executing the method is to provide a tool unit for providing impact tools and/or processing tools for an automated exchange of the impact tool and/or the processing tool. This allows the tools to be changed without the presence of an operator. Thus, there is no risk for the operator to injure himself when changing the tools.

An advantageous measure for executing the method is to apply a series of impacts with the impact tool in a predetermined manner to the turbomachinery component. Particularly when disassembling turbomachinery components, these components or parts thereof can be difficult to loosen or even get stuck. Therefore, a whole series of impacts are required to loosen the turbomachinery component or parts thereof.

An advantageous measure for executing the method, is that a damping unit is provided for damping the transferred load between the turbomachinery component and the impact tool during operation. This damping unit can be provided at the mounting device and/or the impact device or both.

In an advantageous embodiment the damping unit is arranged between the mounting device and the turbomachinery component.

In another advantageous embodiment the damping unit is arranged between the impact unit and the manipulating unit. The damping unit allows to execute impacts with the impact tool on the turbomachinery component. Normally, a manipulating unit cannot withstand such impacts, or at least not often, without sustaining damage. With such a damping unit, the vibrations caused by the impacts can be absorbed and kept away from the manipulating unit, thus drastically increasing the lifetime of the manipulating unit. Furthermore, without a damping unit, accurate automatic control would not be possible as the vibrations would prevent accurate positioning. In preferred embodiments the manipulating unit is a robotic arm.

In another advantageous embodiment the damping unit can be arranged between the ground and the mounting device and/or the impact device.

The damping provided by the damping unit is based on at least one of the group comprising a mechanical damping, for example a spring or a spring arrangement, pneumatic damping, hydraulic damping, and electromagnetic damping. In advantageous embodiments the damping unit comprises a weight for damping and or a damping layer which are made of special materials that have excellent damping properties. The weight can be made of a metal, such as lead. The materials for the damping layer can be for example viscoelastic materials such as viscoelastic urethane polymers, e.g., also known under the trade name Sorbothane®.

An advantageous measure for executing the method is to provide a tempering unit for heating and/or cooling the turbomachinery component and/or the impact tool to a predetermined temperature. Especially for disassembling, the tempering of the turbomachinery component has the advantage that it can support processing in some cases of a stuck or jammed turbomachinery component or parts thereof. The turbomachinery component or parts thereof can be released more easily, thus saving time for the entire method.

In an advantageous embodiment the tempering unit is arranged at the mounting device and/or at the impact device.

In some advantageous embodiment the tempering provided by the tempering unit is based on at least one of the group comprising electrical heating, thermoelectrical heating, inductive heating, fluid heating and combustion heating.

An advantageous measure for executing the method is to provide a detach unit for assisting the processing of the turbomachinery component and/or parts thereof. In an advantageous embodiment the detach unit comprises lubricants for example oil and/or rust solvent in order to ease removing and/or assembling the turbomachinery component and/or parts thereof. Particularly during disassembly, the detach unit has the advantage that in some cases it can assist processing of a stuck or jammed turbomachinery component or parts thereof. But the detach unit can also be helpful during assembly. For example, when assembling a turbomachinery component or parts thereof, oil can be applied to allow better and easier assembly. For applying the lubricant to the turbomachinery component and/or parts thereof, the detach unit can comprise for example a pipe and/or a nozzle.

The detach unit can be either a part of the impact device or a stand-alone device located near the mounting device to apply the lubricant to the turbomachinery component or parts thereof during processing.

In another advantageous embodiment the control device is designed to control one or more parts of the group comprising the impact device, the impact unit, the manipulating unit, the tool unit, mounting device, the tempering unit, the detach unit.

In an advantageous embodiment the controlling by the control device is based on a Look-up-table. Furthermore, it is advantageous that the control device is based on an open loop control. Also, it is advantageous that the control device is based on a closed loop control.

In another advantageous embodiment the control device is a freely programmable control device into which the predetermined schemes can be input. For example, the operator knows all the parameters for processing the turbomachinery component and then programs the control in a scheme so that the processing installation performs all the operations automatically. This has the advantage that when processing different types of turbomachinery components, for example, the processing installation only has to be taught once for each type of turbomachinery components and can then machine this type repeatedly without further teaching.

An advantageous measure for executing the method is that the information for the control by the control device is provided by a sensor device which comprises at least one sensor unit. Especially the interaction of the control device, the sensor device and the impact device ensure that the probability of damage to the turbomachinery component drops significantly. The reason therefore is that the control device controls the impact device after receiving information from the sensor device, in such manner that the force applied to the turbomachinery component or parts thereof is adapted to the current work progress. The at least one sensor unit transfers the information to the sensor device which in the case of more than one sensor units processes the information of all sensor units and provide the whole information to the control device.

In some embodiment of the method, the sensor unit can be a vision system and/or a force sensor, or multiple of them. The sensor unit can be arranged at the impact device and/or at the mounting device and/or in the immediate vicinity of the devices. It is also possible that sensors units are arranged at all mentioned places. In particular the sensor unit can measure at least one of the group comprising the work progress, the position of manipulating unit, the position of the impact unit, the position of the impact tool, the position of the turbomachinery component or parts thereof, the wear of the impact tool, a possible damage of the impact tool, the type of the impact tool which is actually used, the force applied on the turbomachinery component or parts thereof, the wear of the and/or a possible damage of the turbomachinery component or parts thereof, or any other suitable measurable variable for the execution of the method.

It is also possible for different sensor units to be configured with different sensor systems. For example, one sensor unit configured as a vision system is arranged near the turbomachinery component to observe the work progress while a second sensor unit configured as a force sensor is attached to the impact unit to measure the impact force on the turbomachinery component.

In some embodiment of the method the turbomachinery component is a bladed compressor and/or a turbine disk.

It goes without saying that the method in accordance with the disclosure is also suitable for processing all components on which impacts can be executed.

It goes without saying that the embodiments mentioned can be combined with each other in any way.

Furthermore a processing installation for executing the method in accordance with the disclosure is provided, comprising a mounting device, an impact device with an impact unit and a manipulating unit, wherein the impact unit includes an impact tool, and wherein the impact unit is attached to the manipulating unit, wherein a control device is provided for an automatically controlling of the processing installation in order to exert at least one impact with the impact tool on a turbomachinery component.

In some embodiment the processing installation comprises a damping unit. In an advantageous embodiment the impact device comprises the damping unit.

In some other embodiment the processing installation comprises at least one of the group comprising a tempering unit, a detach unit, a tool unit, a sensor device, a sensor unit.

In an advantageous embodiment the control device is designed to control at least one of the group comprising the impact device, the impact unit, the manipulating unit, the tool unit, mounting device, the tempering unit, the detach unit.

In another advantageous embodiment a sensor device is provided for providing information for the control by the control device.

It goes without saying that the processing installation in accordance with the disclosure is also suitable for processing all components on which impacts can be executed.

It goes without saying that the embodiments mentioned can be combined with each other in any way.

Furthermore, an impact device for use in the method in accordance with the disclosure is provided, comprising an impact unit and a manipulating unit, wherein the impact unit comprises an impact tool, and wherein the impact unit is attached to a manipulating unit, wherein a damping unit is provided for damping the transferred load to the impact device during operation.

For such applications as in the method according to the disclosure, where impacts on a component are to be executed by an impact device with a manipulating unit and an impact unit with an impact tool, it is important to provide a damping unit as otherwise the lifetime of the impact device is drastically reduced. The vibrations caused by the impact of the impact tool on the component can cause serious damage to all parts of the impact device, but especially to the manipulating unit.

In some embodiment the impact tool includes at least one of the group comprising a hammer, a chisel, a drill, an impact wrench, a screwdriver, a grinder.

In some embodiment the impact unit comprises a processing tool, wherein the processing tool includes at least one of the group comprising: a grab, pliers.

In some embodiment the impact device is configured to interact with a tool unit, wherein the tool unit provides one or more impact tools and/or processing tools for an automatic exchange of the impact tool and/or the processing tool.

In some embodiment the impact device is configured to interact with a control device.

In some embodiment the impact device is configured to interact with a turbomachinery component which is mounted on a mounting device.

It goes without saying that the impact device in accordance with the disclosure is also suitable for processing all components on which impacts can be executed.

It goes without saying that the embodiments mentioned can be combined with each other in any way.

Further advantageous measures and embodiments of the disclosure will become apparent from the dependent claims.

BRIEF DESCRIPTION OF THE DRAWINGS

The embodiments of the invention will be described in more detail hereinafter with reference to the drawings.

DETAILED DESCRIPTION

Figure 1:
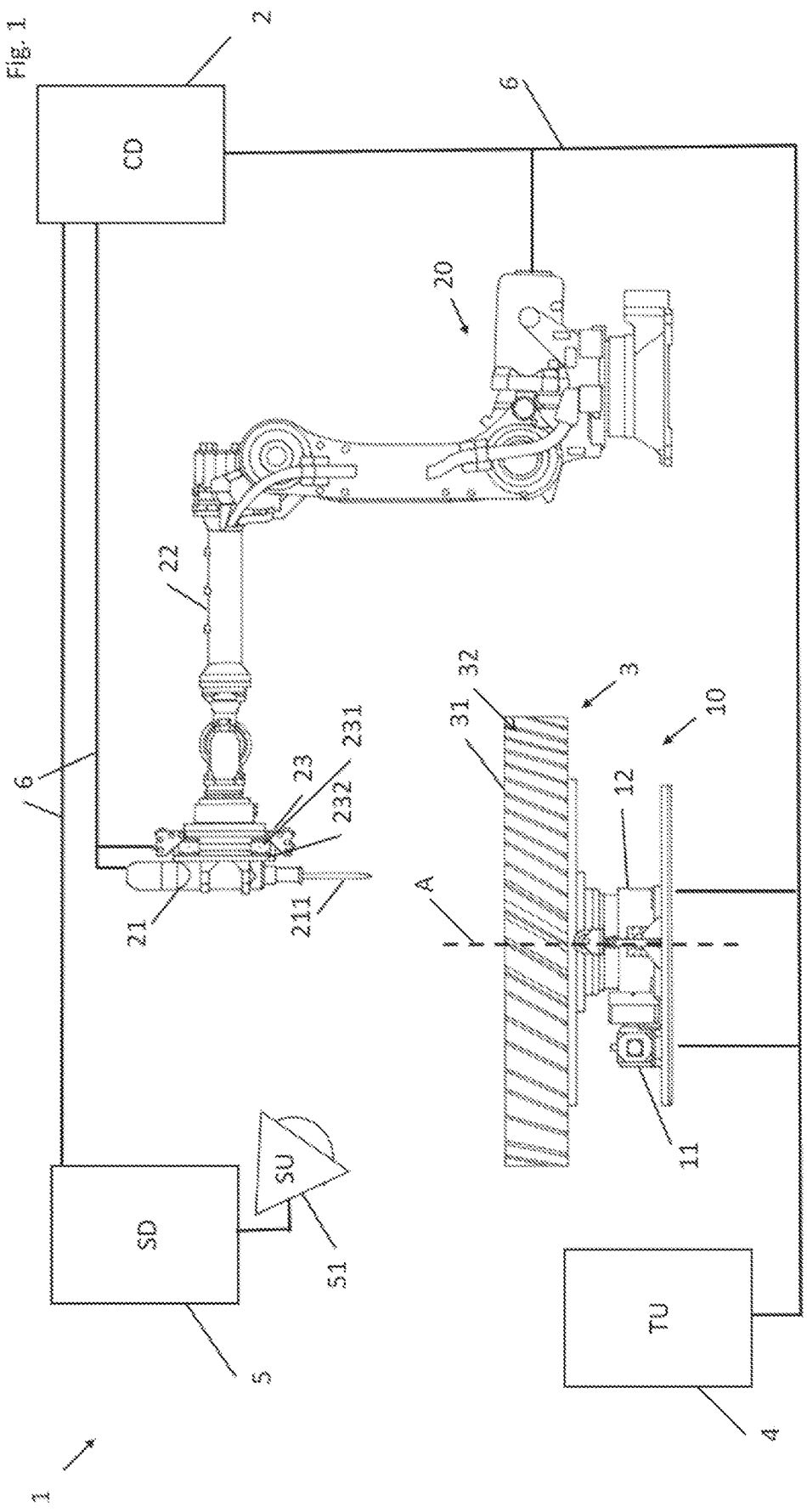
FIG. 1 illustrates a schematic view of an embodiment of the processing installation for executing the method according to the disclosure.

FIG. 1 shows a schematic view of an embodiment of the processing installation 1 for executing the method according to the disclosure. In this embodiment a control device 2 is provided for automatically controlling the processing installation 1 for executing the method according to the disclosure on a turbomachinery component 3. In this embodiment the control device 2 is responsible for the controlling of the mounting device 10, the drive of the mounting device 11, the rotary table 12, the impact device 20, the impact unit 21, the impact tool 211, the manipulating unit 22 and the tool unit 4. The sensor device 5 provides information for the automatic control by the control device 2.

It goes without saying that the connection lines 6 and their indicated path can only be understood schematically.

In this embodiment the disassembly of a turbomachinery component 3 is shown.

At the beginning of the method according to the disclosure the turbomachinery component 3 is mounted on the mounting device 10. In this embodiment the turbomachinery component 3 is a turbine disk 31 with blades 32 and the mounting device is a rotary table 12. In another embodiment the turbomachinery component 3 can be a bladed compressor and/or any other suitable component that can be processed by impact. In another embodiment the mounting device 10 can be an indexing chuck and/or any suitable device for mounting and/or fixing components during processing. The mounting device 10 as a part of the processing installation 1 also automatically controlled by the controlled device 2. So, it can be moved in all three spatial dimensions. Furthermore, the mounting device 10 comprises a drive 11 with which the turbomachinery component 3 can be rotated automatically. Rotation is used for example, when the turbomachinery component 3 mounted on the mounting device 10 is to be moved in the process of processing in order to perform the next work step. It is also possible that the mounting device 10 can perform movements around five-axis (three spatial axes and two rotation axis). In some advantageous embodiment the mounting device 10 can perform movements around six-axis (three spatial axes and three rotation axis).

As a next step the impact device 20 in this embodiment comprising the impact unit 21, the manipulating unit 22 and the damping unit 23 is moved automatically by the control of the control device 2 to a predetermined starting position. In this embodiment the impact unit 21 is attached to the damping unit 23 which is again attached to the manipulating unit 22. The manipulating unit 22 can be moved in all three spatial dimensions. Furthermore, an advantageous measure is that the manipulating unit 22 is configured to move the attached impact unit 21 and the attached damping unit 23 around five-axis (three spatial axes and two rotation axis). In some advantageous embodiment the manipulating unit 22 is configured to move the attached impact unit 21 and the attached damping unit 23 around six-axis (three spatial axes and three rotation axis).

The impact unit 21 comprises the impact tool 211 for interacting with the turbomachinery component 3. Because of the manipulating unit 22 the impact tool can exert impacts on the turbomachinery component 3 from any direction.

In this embodiment the impact tool 211 is a chisel. In another embodiment the impact tool 211 can also be one of the group comprising a hammer, a drill, an impact wrench, a screwdriver, a grinder, any other tool which is suitable as an impact tool. The impact tool 211 is aligned by the automatic control by the control device 2 in the optimum angle under which the first blade 32 of the turbine disk 31 can be removed. The blades 32 are generally inserted into the turbine disk 31. The turbine disk 31 has special grooves, such as dovetails, to accommodate the blades 32. The blades 32 are usually arranged at an angle $\alpha$ in the turbine disk 31, which means that the impact unit 21 with the impact tool 211 must be aligned at the same angle $\alpha$ in order to remove them effectively.

The impact tool 211 will then in this embodiment execute a series of impacts until the first blade 32 is removed. During the processing the damping unit 23 absorbs the vibrations caused by the impacts of the impact tool 211 on the blade 32 for keeping away these vibrations from the manipulating unit 22, thus drastically increasing the lifetime of the manipulating unit 22. Without a damping unit 23, accurate automatic control would not be possible as the vibrations would prevent accurate positioning. Especially for the execution of a series of impacts as in this embodiment this is immensely important.

The damping provided by the damping unit 23 is based on mechanical damping. It is also possible that the damping is based on at least one of the group comprising pneumatic damping, hydraulic damping, and electromagnetic damping. In this embodiment the damping unit comprises a weight 231 for damping and or a damping layer 232 which are made of special materials that have excellent damping properties. The weight 231 can be made of a metal, such as lead. The materials for the damping layer 232 can be for example viscoelastic materials such as viscoelastic urethane polymers, e.g., also known under the trade name Sorbothane®.

The detection of the removal of the first blade 32 is managed by a first sensor unit 51. In this example, the sensor unit 51 is designed as a vision system, which for example uses cameras, to monitor the work progress and transfer them to the sensor device 5 which provides the control device 2 with all data and measured values relevant for the operation of the processing installation 1. If necessary, the control device can then adapt the individual devices and/or units accordingly. In another embodiment, the sensor unit is configured with a force sensor. In another embodiment, the sensor unit is configured with a vision system and a force sensor. Also, it is possible that one sensor unit 51 is arranged at the impact device 20 and/or at the mounting device 10 and/or in the immediate vicinity of the devices. It is also possible that sensors units 51 are arranged at all mentioned places. In particular a sensor unit 51 can measure the work progress, the position of manipulating unit 22, the position of the impact unit 21, the position of the impact tool 211, the position of the turbomachinery component 3 or parts thereof, the wear of the impact tool 211, a possible damage of the impact tool 211, the type of the impact tool 211 which is actually used, the force applied on the turbomachinery component 3 or parts thereof, the wear of the and/or a possible damage of the turbomachinery component 3 or parts thereof, or any other suitable measurable variable for the execution of the method.

It is also possible for different sensor units 51 to be configured with different sensor systems. For example, one sensor unit 51 configured as a vision system is arranged near the turbomachinery component 3 to observe the work progress while a second sensor unit 51 configured as a force sensor is attached to the impact unit 21 to measure the impact force on the turbomachinery component 3.

Once the sensor unit 51 has detected that the first blade 32 has been successfully removed from the turbine disk 31, it transfers this information to the sensor device 5 which passes it on to the control device 2, which in turn controls the mounting device 10 so that the turbine disk 31 mounted on it continues to rotate around the axis A to the next blade 32 to be released.

The control device 2 moves the impact tool 211 in the optimum position for this next work step. This position can be controlled within the usual accuracy of mechanical equipment. This optimum position can also be adjusted automatically by the control device 2. Likewise, the impact tool 211 can be moved to exactly the same position for each turbomachinery component 3 and/or part to be processed and always processed under exactly the same conditions. These include, among other things, the angle at which the impact on the turbomachinery component 3 is performed or the force with which it is performed. A human operator could never do this with such precision and repetition rate. Overall, the ideal working conditions for each step of the processing are always available for different turbomachinery components 3 or parts thereof. This makes it possible on the one hand to significantly increase the speed of processing the turbomachinery component 3, which in turn increases efficiency, and on the other hand to deliver consistently high processing quality.

In the event that the actual blade 32 does not move during use of the impact tool 211, or the impact tool 211 is damaged during operation, a tool unit 4 is provided for automatically exchanging the impact tool 211. In the first case, for example, the impact tool 211 can be replaced from the chisel to a hammer with a larger impact surface to apply more force to the blade 32. In the second case, when the sensor unit 51 detects that the impact tool 211 is damaged or broken, the control device 2 receives this information and controls the whole impact device 20 to replace the impact tool 211 with a new one from the tool unit 4. The tool unit 4 comprises all possible tools for processing the turbomachinery component 3 and parts thereof. Such tools can be processing tools or impact tools 211, such as the group of impact tools 211 mentioned above. Furthermore, the tool unit 4 can include the same impact tool 211 more than once, in case the first impact tool 211 is damaged. The entire automated process of exchanging the impact tool 211 no longer poses a risk to the operator, unlike exchanging tools by hand.

In other embodiments if a blade 32 does not move during the operation of the impact tool 211 a tempering unit and/or a detach unit is provided. The tempering unit is for heating and/or cooling the turbomachinery component 3 and/or the impact tool 211 to a predetermined temperature. Especially for disassembling, the tempering of the turbomachinery component 3 has the advantage that it can support processing in some cases of a stuck or jammed turbomachinery component 3 or parts thereof. The turbomachinery component 3 or parts thereof can be released more easily, thus saving time for the entire method. For example, the tempering unit can be arranged at the mounting device 10 for tempering the turbomachinery component 3. In some embodiment it is possible that the tempering unit is arranged at the impact device 20 or attached to the manipulating unit 22. In this embodiment, there are three options possible depending on the current processing situation. Firstly, the tempering unit can temper the impact tool 211, secondly the turbomachinery component 3 or thirdly both. In an advantageous embodiment the tempering provided by the tempering unit is based on at least one of the group comprising electrical heating, thermoelectrical heating, inductive heating, fluid heating and combustion heating.

In another embodiment is it advantageous to provide a detach unit for assisting the processing of the turbomachinery component 3 and/or parts thereof. In an advantageous embodiment the detach unit comprises lubricants for example oil and/or rust solvent in order to ease removing and/or assembling the turbomachinery component 3 and/or parts thereof. Particularly during disassembly, the detach unit has the advantage that in some cases it can assist processing of a stuck or jammed turbomachinery component 3 or parts thereof. For applying the lubricant to the turbomachinery component 3 and/or parts thereof, the detach unit can comprise for example a pipe and/or a nozzle.

The detach unit can be either a part of the impact device 20 or a stand-alone device located near the mounting device 10 to apply the lubricant to the turbomachinery component 3 or parts thereof during processing.

But the detach unit can also be helpful during assembly. For example, when assembling a turbomachinery component or parts thereof, oil can be applied to allow better and easier assembly.

The whole process will go on until the last blade 32 is removed from the turbine disk 31.

Figure 2:
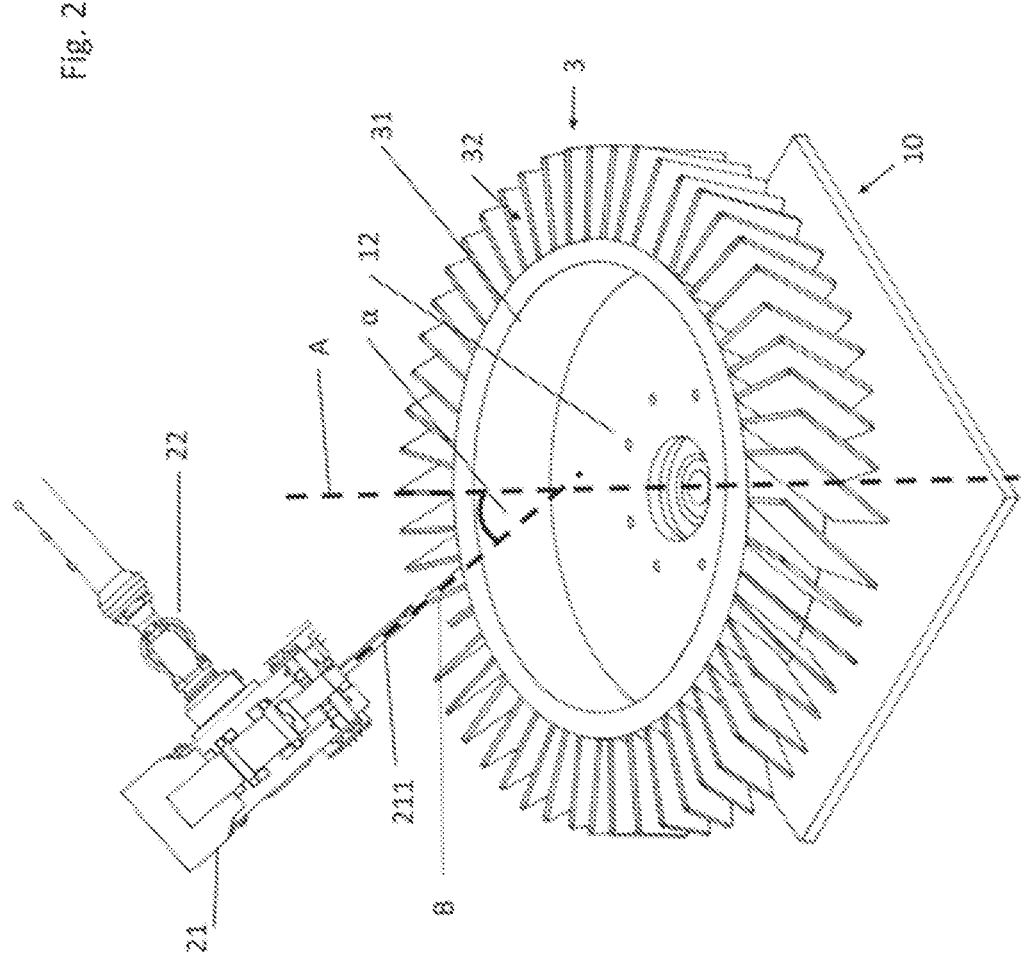
FIG. 2 illustrates a section of the schematic view of the embodiment according to FIG. 1.

FIG. 2 shows a section of the schematic view of the embodiment according to FIG. 1 in which the impact unit 21 has been moved to a predefined start position.

Since this is a section of FIG. 1, it goes without saying that the explanations with respect to the description of the first figure are also valid in the same way or in analogously the same way for the second figure. Same reference numerals designate the same features that have been explained with reference to the first figure or functionally equivalent features.

As mentioned above, some parts of the turbomachinery component 3 are arranged at an angle α. In this embodiment, the blades 32 are arranged at an angle α in the turbine disk 31. The angle α is the angle which is enclosed by the axis B and the axis A. To effectively remove the blades 32 from the turbine disk 31, the impact device 21 with the impact tool 211 must be arranged on the same axis B as the blades 32.

During processing, the sensor unit 51 checks whether the processed blade 32 and the impact unit 21 with the impact tool 211 are on the same axis B and reports any deviations to the sensor device 5 which informs the control device 2, which controls the impact device 20 or the manipulating unit 22 in such a way that the processed blade 32 and the impact unit 21 are on the same axis B again.

It goes without saying that the embodiments mentioned in the figures can be combined with each other in any way.

The invention claimed is:

1. A method for processing a turbomachinery component, the method comprising:
   providing a processing installation comprising a mounting device, an impact device with an impact unit, a manipulating unit and a damping unit, the impact unit including an impact tool, the impact unit attached to the manipulating unit, and the damping unit arranged between and directly connected to the impact unit and the manipulating unit to absorb vibrations caused by an impact of the impact tool on the turbomachinery component to keep vibrations away from the manipulating unit;
   mounting the turbomachinery component on the mounting device;
   arranging the manipulating unit and the mounting device in a predetermined position relative to each other; and
   automatically controlling the processing installation with a controller to exert at least one impact with the impact tool on the turbomachinery component.

2. The method in accordance with claim 1, wherein the at least one impact is a series of impacts with the impact tool exerted in a predetermined manner.

3. The method in accordance with claim 1, wherein the damping provided by the damping unit is based on at least one of the group consisting of a mechanical damping, pneumatic damping, hydraulic damping, and electromagnetic damping.

4. The method in accordance with claim 1, wherein the impact tool includes at least one of the group comprising a hammer, a chisel, a drill, an impact wrench, a screwdriver, a grinder.

5. The method in accordance with claim 1, wherein the impact unit comprises a processing tool, the processing tool including at least one of the group comprising a grab and pliers.

6. The method in accordance with claim 1, wherein a tool unit is provided for providing the impact tool or a processing tool for an automated exchange of the impact tool or the processing tool.

7. The method in accordance with claim 1, wherein a tempering unit is provided for heating or cooling the turbomachinery component or the impact tool to a predetermined temperature.

8. The method in accordance with claim 7, wherein the tempering provided by the tempering unit is based on at least one of the group consisting of electrical heating, thermo-electrical heating, inductive heating, fluid heating and combustion heating.

9. The method in accordance with claim 1, wherein the method for processing a turbomachinery includes a disassembly of the turbomachinery component.

10. The method in accordance with claim 1, wherein a detach unit is provided for assisting the processing of the turbomachinery component or parts thereof.

11. The method in accordance with claim 1, wherein a detach unit comprises lubricants in order to ease removing or assembling the turbomachinery component or parts thereof.

12. The method in accordance with claim 1, wherein the controller is configured to control one or more parts of the group consisting of the impact device, the impact unit, the manipulating unit, a tool unit, the mounting device, a tempering unit, and a detach unit.

13. The method in accordance with claim 1, wherein the controlling with the controller is based on a Look-up-table.

14. The method in accordance with claim 1, wherein the controller is based on an open loop control.

15. The method in accordance with claim 1, wherein the controller is based on a closed loop control.

16. The method in accordance with claim 1, further comprising a sensor device configured to provide information for the controller, the sensor device comprising at least one sensor unit comprising at least one of a vision system or a force sensor.

17. The method in accordance with claim 16, wherein the sensor unit is arranged at the impact device or at the mounting device or in an immediate vicinity of the impact device or at the mounting device.

18. The method in accordance with claim 1 wherein the turbomachinery component is a bladed compressor or turbine disk.

* * * * *